United States Patent [19]
Santore et al.

[11] Patent Number: 5,615,211
[45] Date of Patent: Mar. 25, 1997

[54] TIME DIVISION MULTIPLEXED BACKPLANE WITH PACKET MODE CAPABILITY

[75] Inventors: Peter M. Santore, Cheshire; John M. O'Neil, Jr., Litchfield, both of Conn.

[73] Assignee: General DataComm, Inc., Middlebury, Conn.

[21] Appl. No.: 532,888

[22] Filed: Sep. 22, 1995

[51] Int. Cl.$^6$ .................................................. H04L 12/56
[52] U.S. Cl. ........................... 370/419; 370/461; 370/471
[58] Field of Search ............................ 370/60, 60.1, 61, 370/94.1, 94.2, 94.3, 95.1, 95.3, 95.2, 58.1, 58.2, 58.3, 77, 85.1, 85.2, 85.3

[56] References Cited

U.S. PATENT DOCUMENTS

4,569,042  2/1986  Larson ....................................... 370/60

Primary Examiner—Douglas W. Olms
Assistant Examiner—Dang Ton
Attorney, Agent, or Firm—David P. Gordon

[57] ABSTRACT

An integrated TDM-based/packet-based telecommunications backplane system includes a multi-bit backplane bus, a plurality of TDM data modules and packet based data modules coupled to the backplane bus, and a frame controller coupled to the bus which generates a frame by pre-assigning a first plurality of timeslots of a frame for the fixed rate TDM traffic, and allotting the remainder of the frame timeslots as a pool for packet-based traffic. The TDM data modules, which can include bit, and byte or nibble mode modules, place data on the backplane bus in their allotted time slots. The packet-based data modules contend for the pooled timeslots by raising a request on a "request" thread of the backplane bus when the packet module has a packet to send, and dropping the request and raising a busy flag on the "busy" thread while sending a data packet. In order to insure that only one packet-based data module will attempt to raise the request flag at a given time, the pooled timeslots are divided among the packet data sources for purposes of raising the request flag only. Thus, only one packet-based data module can raise its request flag during a given timeslot of the pool; although when sending data, the packet-based data module can send during all timeslots of the pool.

12 Claims, 4 Drawing Sheets

| BUS THREAD | BIT MODE | BYTE MODE | PACKET MODE |
|---|---|---|---|
| 0 | DATA 0 | DATA 0 | DATA 0 |
| 1 | CONTROL 0 | DATA 1 | DATA 1 |
| 2 | CONTROL 1 | DATA 2 | DATA 2 |
| 3 | CONTROL 2 | DATA 3 | DATA 3 |
| 4 | TYPE 0 | TYPE 0 | TYPE 0 |
| 5 | TYPE 1 | TYPE 1 | TYPE 1 |
| 6 | SPARE 0 | SPARE 0 | DATA 4 |
| 7 | SPARE 1 | SPARE 1 | DATA 5 |
| 8 | ADDRESS 0 | ADDRESS 0 | DATA 6 |
| 9 | ADDRESS 1 | ADDRESS 1 | DATA 7 |
| 10 | ADDRESS 2 | ADDRESS 2 | DATA 8 |
| 11 | ADDRESS 3 | ADDRESS 3 | DATA 9 |
| 12 | ADDRESS 4 | ADDRESS 4 | DATA 10 |
| 13 | ADDRESS 5 | ADDRESS 5 | DATA 11 |
| 14 | ADDRESS 6 | ADDRESS 6 | DATA 12 |
| 15 | ADDRESS 7 | ADDRESS 7 | DATA 13 |
| 16 | ADDRESS 8 | ADDRESS 8 | DATA 14 |
| 17 | ADDRESS 9 | ADDRESS 9 | DATA 15 |
| 18 | ADDRESS 10 | ADDRESS 10 | OVERHEAD 0 |
| 19 | ADDRESS 11 | ADDRESS 11 | OVERHEAD 1 |
| 20 | | | REQUEST |
| 21 | | | BUSY |

TIME DIVISION MULTIPLEXED BACKPLANE WITH PACKET MODE CAPABILITY

BACKGROUND

1. Field of the Invention

The present invention relates generally to telecommunications data time division multiplexed backplane systems. More particularly, the present invention relates to backplane multiplexing systems and methods capable of internetworking bit serial, byte parallel, and packet based products.

2. State of the Art

Apparatus for time division multiplexing (TDM), and their use in the backplanes of telecommunications systems have been known in the arts for some time. Typically, in backplane systems, time division multiplexers are comprised of interfaces to a plurality of channels, buffers for incoming and outgoing information, and a frame processor which includes a memory means and a recirculating counter which addresses the memory means. The frame processor is used to select information from the plurality of channels for sending over the backplane toothers of the channels according to a desired framing algorithm. Many different framing algorithms are known in the art, such as are disclosed in commonly owned U.S. Pat. No. 4,888,770 to Bains, U.S. Pat. No. 4,885,745 to Gordon, and U.S. Pat. No. 4,727,536 to Reeves et al. which are hereby incorporated by reference herein in their entireties. As is known in the art, the constant bit rate information which is multiplexed over the backplane in this manner may be bit serial, or nibble or byte parallel.

More recently, it has become desirable to provide multiplexers for packet-based LAN (e.g., ETHERNET) and ATM data (these multiplexers being called "routers" because the LAN and ATM packets have the destination addresses imbedded in the packets). While ATM data is of a fixed packet size, LAN data can assume any of various formats which provide different sized packets. In order to accommodate LAN and other bursty packet-based telecommunications traffic, equipment utilizing packet-based backplane buses have been provided. However, these packet-based backplane busses have existed completely apart from the TDM backplane busses, and are rarely, if ever, found in a single piece of equipment; and there are certainly no known backplane systems which accommodate both TDM bit and/or byte data, and packet-based data on a single backplane bus. Thus, various efficiencies which can be obtained by the merging of the TDM and packet-based "worlds" such as the sharing of common bus drivers and receivers and backplane bus resources have been unrecognizable.

SUMMARY OF THE INVENTION

It is therefore an object of the invention to provide a time division multiplexed telecommunications backplane system capable of accommodating packet-based data.

It is another object of the invention to provide a telecommunications backplane bus on which is multiplexed bit, nibble or byte, and packet-based data.

It is a further object of the invention to provide a true TDM/packet hybrid backplane bus which can be accessed by a comparatively simple interface.

In accord with the objects of the invention which will be discussed in more detail below, the telecommunications backplane of the invention generally includes a multi-bit backplane bus, a plurality of TDM-based data modules and packet-based data modules coupled to the backplane bus, and a frame controller coupled to the backplane bus which generates a frame by pre-assigning a first plurality of timeslots of a frame for fixed rate TDM traffic, and allotting the remainder (or most of the remainder) of the frame timeslots as a pool for packet-based traffic. The fixed rate TDM-based data modules place data on the backplane bus in their allotted time slots. The bursty packet-based data modules contend for the pooled timeslots.

According to a preferred aspect of the invention, contention for the remaining timeslots by the packet-based data modules is conducted among the packet-based data modules by providing a "request" thread and a "busy" thread on the backplane, and by requiring that a packet-based data module raise a request flag when it is ready to send a data packet, and drop the request flag and raise the busy flag upon sending a data packet. In order to insure that only one packet-based data module will attempt to raise the request flag at a given time, the pooled packet data timeslots are divided among the packet-based data modules for purposes of raising the request flag only. In other words, only one packet-based data module can raise its request flag during a given packet-based timeslot; although when sending data, the packet source can send during all of the packet-based timeslots.

According to other preferred aspects of the invention, the backplane data bus, in addition to having "request" and "busy" threads, includes twenty additional threads, and the backplane data bus can be used in bit, byte or nibble, and packet modes. Of the twenty threads, in packet mode, sixteen are dedicated to data, and four are dedicated to overhead or control. In bit mode, at least twelve threads are dedicated to address, one to data, and at least two to overhead or control. In byte (nibble) mode, twelve threads are dedicated to address, four to data ("nibble"), and two to overhead or control.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
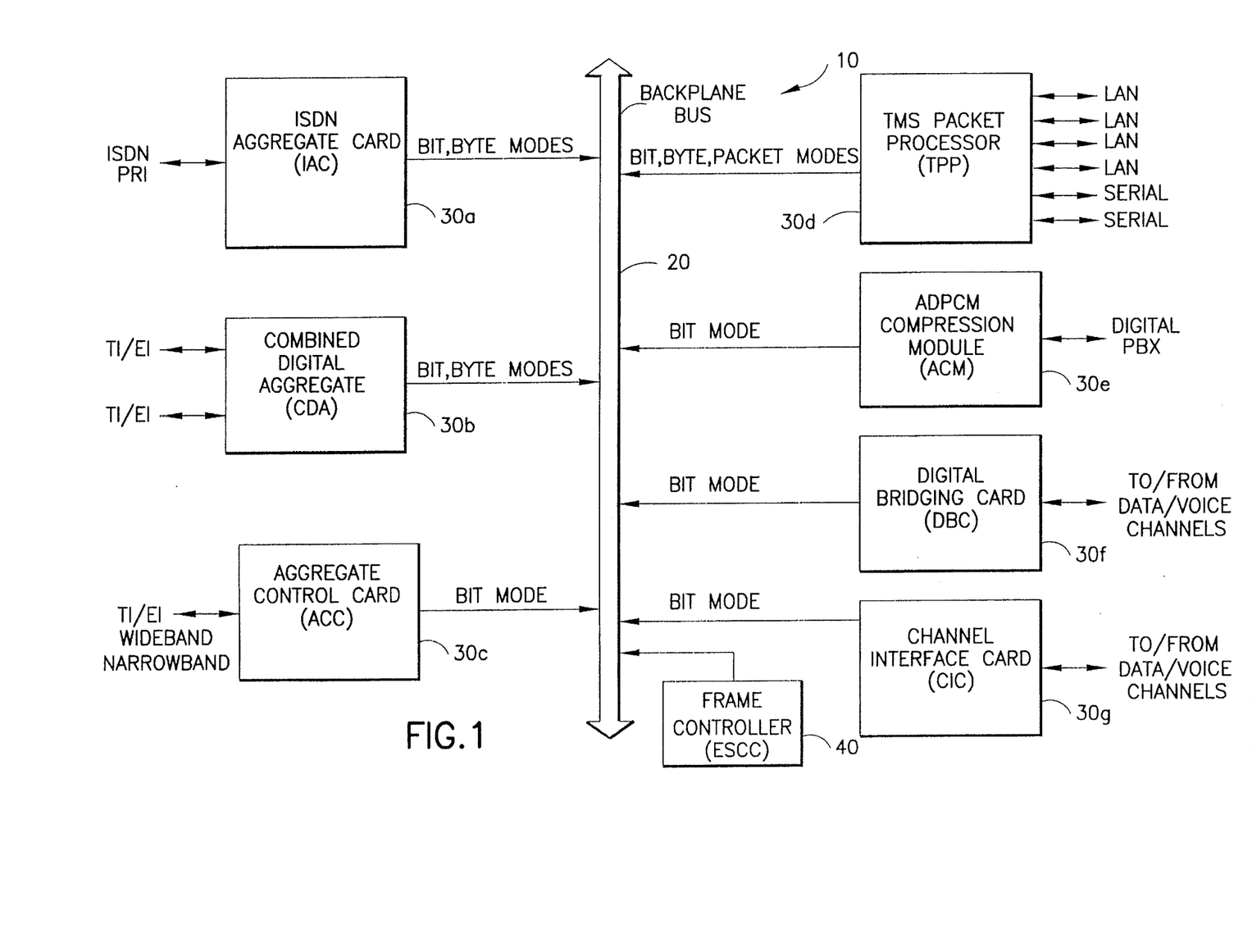
FIG. 1 is a schematic diagram showing the backplane bus and controller of the invention in conjunction with various sources of data traffic.

Turning to FIG. 1, a high level block diagram of a telecommunications backplane system 10 is seen. The telecommunications backplane includes a backplane data bus 20, a plurality of telecommunications circuit boards or cards 30a–30g, and a frame controller card 40. The frame controller card 40 which runs the frame and controls who drives the backplane data bus 20 is commercially available from the assignee hereof, General DataComm, Inc., as the ESCC (Enterprise System Control Module). While an overview of the ESCC 40 is set forth below, details regarding the ESCC 40 are set forth in copending Ser. No. 08/430,210 which is hereby incorporated by reference herein in its entirety. It will be appreciated that the telecommunications backplane system 10 will typically also include a clock bus (not shown), physical electrical connectors (not shown), etc. which are all typically contained in a cabinet (not shown), while the frame controller card 40 will have counters (not shown), a processor (not shown), etc. for calculating and directing the selects for the data frame.

Figure 3:
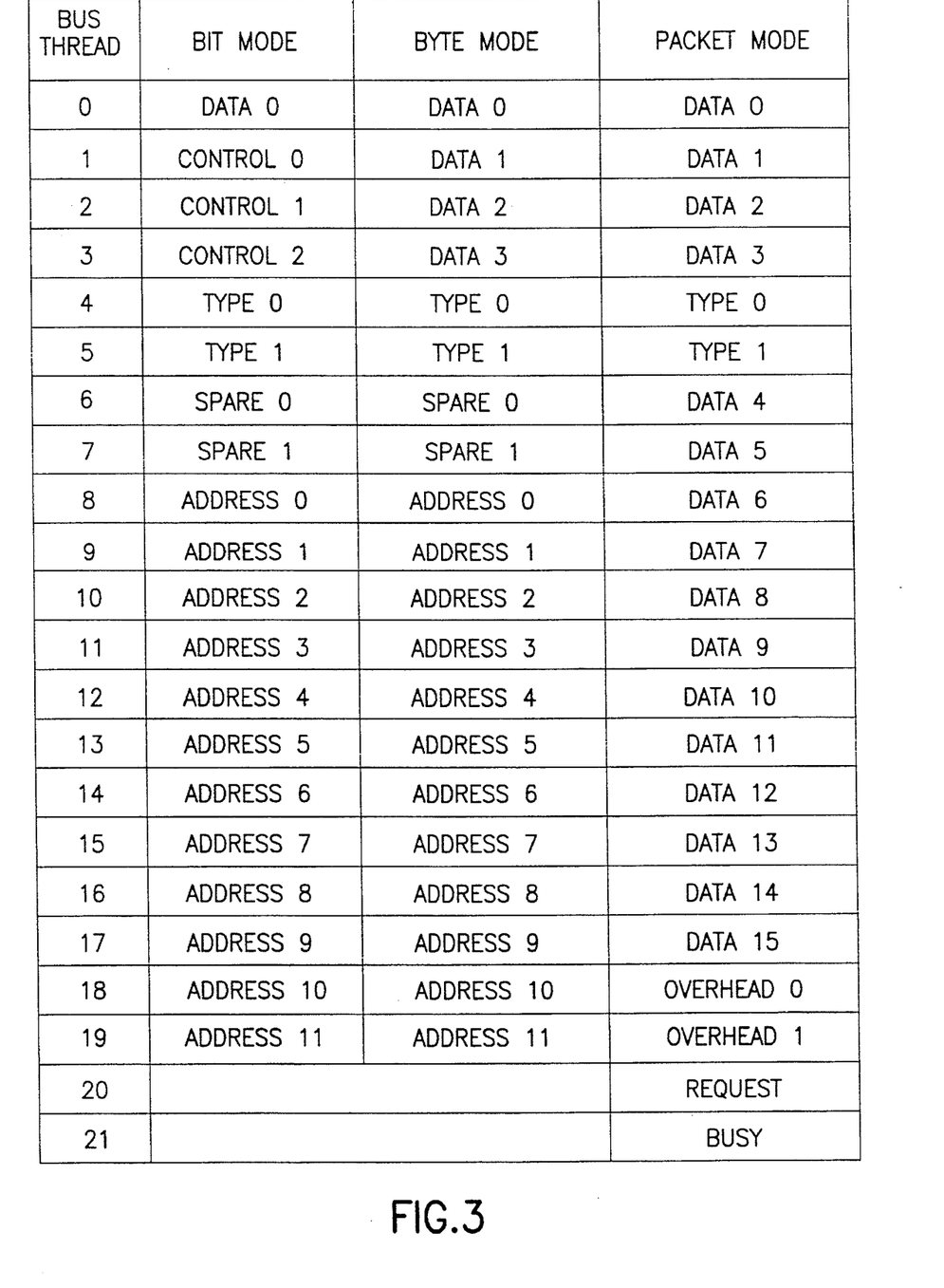
FIG. 3 is a chart of how the threads of the backplane bus of FIG. 1 are assigned in the bit mode, byte mode, and packet mode.

The backplane data bus 20 shown in FIG. 1 is a high speed data bus (e.g., 16.896 MHz) and preferably includes at least twenty-two threads which will be described in more detail with reference to FIG. 3. The telecommunications circuit boards 30a–30g as shown in FIG. 1 include aggregate (i.e., relatively higher throughput; often multiplexed) interface cards 30a, 30b, 30c, and channel interface cards (i.e., relatively lower throughput; usually not multiplexed) 30d, 30e, 30f, 30g. All of the cards shown in FIG. 1 are commercially available from General DataComm, Inc., the assignee hereof, under the names listed in FIG. 1. It should be appreciated that while seven different types of cards are shown coupled to the backplane data bus 20, a plurality of any of the seven types of cards can be coupled to the backplane data bus. In addition, the system will accommodate different types of cards than those shown. Furthermore, it should be appreciated that it is not necessary to have a plurality of different types of cards utilizing the system in order for the system to properly function.

Looking briefly at each of the aggregate cards, it will be appreciated that the CDA (Combined Digital Aggregate) card 30b provides a multiplexer function for interfacing channels to a plurality of T1 or E1 telecommunications trunks. The CDA card 30b can function in both a bit mode where all bus transfers are bit serial, and a byte mode, where bus transfers are parallel (e.g., four bits wide—nibble). Where the CDA card 30b interfaces with E1 trunks, the CDA card supports data rates of up to 2.048 Mbits/sec, provides two ports, and performs inter alia the following functions: clock and data recovery from a CEPT line; frame, CRC and CAS multiframe alignment; insertion and extraction of signaling bits and framing pattern; CRC detection and generation; alarm detection and generation; local and remote loopback; channel associated signaling (CAS); system clock or receive clock selection for transmission of data. The microprocessor of the CDA card performs four basic functions in the E1 interface situation: it initializes an E1 input-output (I/O) plug-in card upon power up, scans for alarm conditions, initiates alarms to be transmitted, and performs serial to parallel bus conversion. When the CDA card 30b interfaces with T1 trunks, it supports data rates of up to 1.544 Mbits/sec, provides two ports which enable interfacing with a DACS, a D4 device (e.g., a digital PBX), or an internodal trunk, as well as a DS1 interface, and performs all the functions described above with reference to the E1-CDA.

The IAC (ISDN Aggregate Card) 30a is also an aggregate interface card, and is used in conjunction with an ISDN service. The IAC card has essentially the same functionality as the CDA card 30b described above, and in addition provides. ISDN signalling support. Thus, the IAC card 30a is effectively a multiplexer capable of receiving a serial bit stream or a stream of nibbles or bytes from the backplane bus 20, and providing them for output in byte serial form on an ISDN line at rates of 1.544 Mbits/sec (for T1), or 2.048 Mbits/sec (for E1).

The third aggregate interface card is the "ACC" (Aggregate Control Card) card 30c which provides a wideband or narrowband interface to a single telecommunications trunk. The ACC card uses plug-in cards to provides interfaces to, and can convert aggregate data to the signal standards required by different aggregate trunks such as a T1, E1, RS-422, RS-423, V.35, RS-232, etc. Thus, the ACC card supports various rates from 2.048 Mbits/sec down to 4.8 Kbits/sec. Unlike the IAC and CDA cards, however, the ACC card 30c can only work in bit serial mode. It will be appreciated that the ACC performs frame calculations and adds overhead and frame sync bits as required when assembling a frame of data; and conversely synchronizes to frame sync bits and demultiplexes received data so that channel data, channel control, and overhead bits can be sent to correct channel destinations when data is being received. Additional information regarding the ACC card may be obtained by reference to General DataComm publications 036R477-000 and 036R485-000 which are hereby incorporated by reference herein in their entireties.

The channel interface cards include the TPP (TMS™ Packet Processor) card 30d, the ACM (ADPCM Compression Module) card 30e, the DBC (Digital Bridging Card) card 30f, and the CIC (Channel Interface Card) card 30g.

The TPP card 30d is a powerful frame-switching engine based on multiple RISC processors which provides frame relay fast packet switching and LAN/WAN internetworking. The TPP allows the user to consolidate LAN, frame relay, and SNA/SDLC traffic from hundreds of remote locations using packet processing technology. Each TPP card provides up to four local ETHERNET or four token ring interfaces for LAN traffic (or a combination of two each), as well as two external DB-25 (serial) interfaces and one hundred twenty-eight pathways for LAN and non-LAN traffic (HDLC-formatted serial synchronous data). These pathways are provisioned over T1/E1, FT1/FE1, DDS, ISDN, narrowband and/or frame relay circuits, allowing hundreds of remote branch offices to be consolidated within a single, fault tolerant, frame-switching environment. The TPP's powerful RISC processors quickly route traffic using a hardware-based address processor that maintains information such as NetBIOS names, network layer addresses, traffic priority, etc., about each network-attached device. These processors enable rapid routing decisions to be made on a packet by packet basis as well as gathering data essential for managing large distributed networks. In addition, the TPP supports a complete suite of LAN protocols. As indicated in FIG. 1, and as will be explained in more detail below, the TPP interfaces with the backplane bus 20 and is capable of functioning in bit, byte, and packet modes.

The ACM card 30e which works in bit mode only, provides the means for interfacing a single DS1 or E1 line containing twenty-four or thirty PCM voice circuits to the system. The ACM card 30e compresses the voice data according to ADPCM compression techniques, thereby affording a substantial bandwidth savings over 64K PCM. This bandwidth savings can be utilized for transporting data traffic on a trunk which previously carried voice alone. Also, during disaster recovery and fallback, and through the use of intelligent automatic rerouting (IAR), the ADPCM voice channels can be compressed further to occupy even less bandwidth, thus allowing more circuits to remain active. The ACM card has pass-through channel capability which allows any or all channels to be passed unmodified through the module, thereby permitting data or uncompressed voice to be passed through. Thus, signalling information (CCS) can be transported in any timeslot.

The DBC card 30f is a bit mode card which allows multiple remote workstations to share a common communications path. The DBC card supports data, voice, and video broadcasting. In addition, the DBC card 30f supports polling applications by allowing multidrop circuits to be created. The DBC performs the function of an MJU/MAU. In addition, it extends the network management function to multipoint circuits, thereby giving the user added functions such as configuration, status, diagnostics, alarms, autopath, intelligent automatic reconfiguration (IAR), and time oriented reconfiguration. The DBC card is described in detail in General DataComm, Inc. Publication No. 036R478-000 which is hereby incorporated by reference herein in its entirety.

The CIC card 30g is also a bit mode card which is the node FAST BUS interface for up to sixty-four local channel modules. It multiplexes and demultiplexes data from channel modules onto the high speed backplane data bus 20. The CIC card 30g is responsible for frame calculation and channel control.

The ESCC 40 is a printed circuit board assembly which is provided to monitor and control the activities of all of the other cards and modules in the shelf of the system. The ESCC has numerous functions including: permanent storage of software programs for all of the cards and configuration information for the local node; communications with a local controller if locally connected, with ESCCs or other system control cards in neighboring nodes of the network, and with common and channel cards in the node; control of customer data traffic between common cards within the node, and control of all block mode transfers within the node between TPPs, where all data is transferred via the backplane data bus 20; generation of timing information for use within the local node, and for transfer of network timing between nodes; control of redundancy of the common cards by command to a redundancy control card (not shown); and control of an answer-only modem (not shown) which is used to remotely connect a controller to the node.

Figure 2:
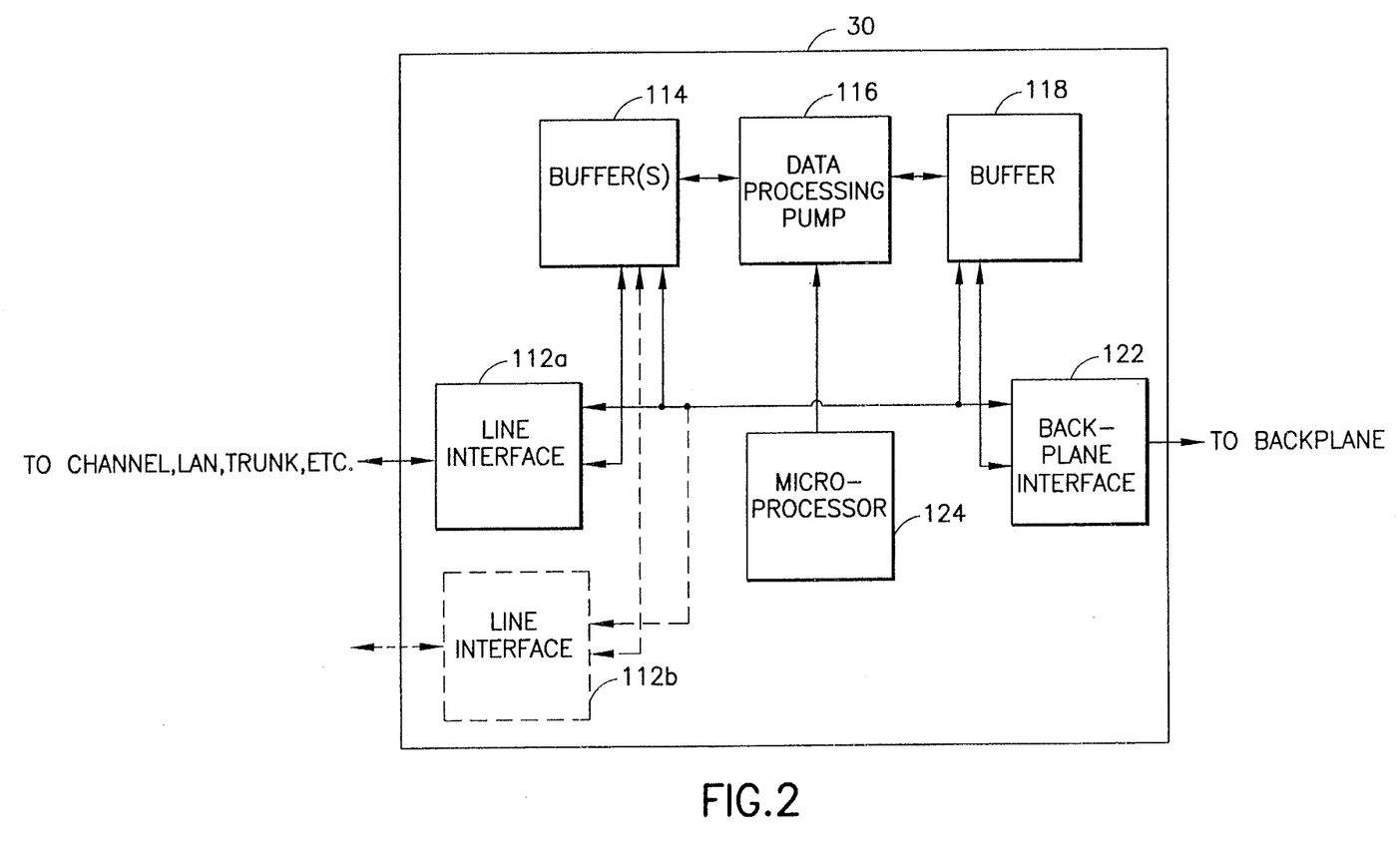
FIG. 2 is a simplified block diagram of a typical source of data traffic shown in FIG. 1.

The telecommunications cards or circuit boards 30a–30g (generally referred to as cards 30) are all differently constructed, but generally include many similar elements. Thus, by way of example, all of the cards 30 may be constructed as shown in FIG. 2 with one or more line interfaces 112a, 112b, one or more line interface data buffers 114, a data processing pump 116, a backplane data buffer 118, a backplane interface 122, and a microprocessor 124. Typically, in the incoming direction, and under control of the microprocessor 124, data is received from one or more channels, LANs, trunks, etc., by the line interfaces 112a, 112b, and stored in the line interface buffers 118. The data is then multiplexed and/or otherwise processed by the data processing pump 116, and stored in the backplane buffer 118, before being output on the backplane by the backplane interface 122 in the appropriate mode (i.e., bit, byte (nibble), or packet mode as discussed hereinafter) according to the backplane data frame which will be discussed below. Similarly, in an outgoing direction, bit, byte, or packet data taken off the backplane by the backplane interface 122 is stored in the backplane data buffer 118. The data is then demultiplexed (or routed) and/or otherwise processed by the data processing pump 116 and sent to the line interface buffers 114. When the data is to be output from the card 30, it is taken out of the buffers 114 by the line interfaces 112, and placed on the channel(s) with which the card 30 is interfaced. Typically, the microprocessor 124 of the card 30 is used to monitor the functioning of the other components of the card (e.g., the "fullness" of the buffers), as well as to provide any multiplexing and/or demultiplexing frame which is utilized internally by the card 30.

As suggested above, the cards 30 place data on the backplane bus 20 according to a frame (discussed below with reference to FIG. 4), and in a bit, byte (or nibble), or packet mode manner. The backplane bus preferably includes at least twenty-two threads, with twenty of the threads being used in all three modes. Thus, as seen in FIG. 3, where a card functions in the bit mode, the bit of data is placed on thread 0, control bits are placed on threads 1–3, two "type bits" which identify a null transfer (type=00), a data bit (type=01), a control nibble 1 for certain EIA controls such as RTS or CTS (type=10), or a control nibble 2 for other EIA controls (type=11) are placed on threads 4–5, threads 6–7 are left undefined, and the twelve address bits (which identify a backplane address on one of the cards 30) are placed on threads 8–19. It should be noted that a null transfer (type=00) in the bit mode is a signal to bit mode cards to ignore the data.

Where the card 30 functions in the byte mode, four bits of data (i.e., a nibble) are placed on threads 0–3, two "type bits" are placed on threads 4–5 to identify a null transfer (type=00), a control nibble (type=11), or which nibble is being sent (type =01 for nibble 1; and type=10 for nibble 2), threads 6–7 are left undefined, and the twelve address bits are placed on threads 8–19. As indicated above, the null transfer (type=00) in byte mode is a signal to byte mode cards to ignore the data.

Further, and as will be discussed in more detail hereinafter, when the card 30 functions in the packet mode, sixteen data bits are placed on threads 0–3 and 6–17, the "type bits" are set to "00" and placed on threads 4 and 5 in order to signal the bit and byte mode cards to ignore the data (types 01, 10, 11 not being used in packet mode), and two overhead bits are placed on threads 18 and 19. The overhead bits are used to indicate normal data, "fill" data, end-of-packet data, and an abort of packet transmission or receipt. As will be discussed below, the packet mode also utilizes two additional threads of the bus to raise a ready flag (i.e., a request thread), and to indicate that a packet is being sent (i.e., a data bus "busy" thread).

Figure 4:
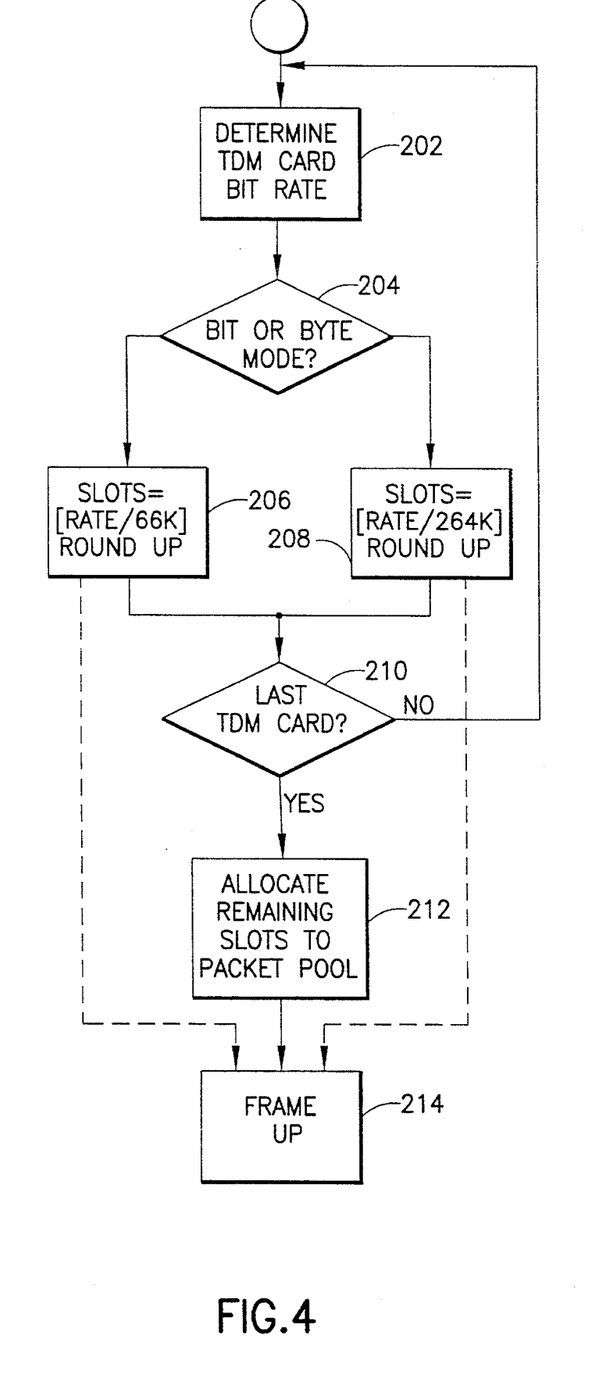
FIG. 4 is a flow chart of the framing algorithm utilized by the frame controller of FIG. 1.

Turning now to FIG. 4, a simple framing algorithm utilized by the frame controller 40 is seen. In accord with the invention, in order to accommodate the conventional TDM type data (i.e., synchronous data), the backplane is run according to a TDM type frame. Thus, if the backplane is run at a speed of 16.896 MHz, the frame could include at least 16.896 million time slots. More appropriately, a smaller repeating frame is utilized. In accord with the presently preferred embodiment, the repeating frame is chosen to be of length two hundred fifty-six (i.e., each frame slot being repeated 66,000 times per second), although frames of different lengths or frames having superframes such as might be generated by co-owned U.S. Pat. No. 4,881,224 to Bains, or other known techniques could be utilized. Regardless of the actual framing algorithm utilized, in accord with the invention, the non-packet cards (i.e., the TDM cards) are assigned slots according to their needs. Thus, for example, where the simple frame of length two hundred fifty-six is utilized, if a card which works in bit mode needs to place 1,056,000 bits per second on the backplane, the bit serial card would be assigned sixteen of the two hundred fifty-six slots of the frame; i.e., every sixteenth timeslot, or 1/16 of the 16.896 MHz bandwidth. Similarly, if a card which works in byte mode needs to place 1,056,000 bits per second on the backplane, the byte mode card would be assigned four of the two hundred fifty-six slots of the frame; i.e., every sixtyfourth timeslot, as the byte mode card places four bits on the data bus every timeslot. In particular, at step 202, a determination is made as to the bit rate of the card. At step 204, it is determined whether a TDM card is working in bit or byte mode. If in bit mode, at 206 the bit rate of the card is in bits per second is divided by 66,000 (18,896,000 bits/sec/256) and rounded up to the nearest integer to determine the number of time slots needed by that card in the frame. If in byte mode, at 208, the bit rate of the card is divided by 264,000 (4·(18,896,000/256)) to determine the number of time slots needed by that card in the frame. At 210, a determination is made whether all TDM cards have been accounted for. If not, the algorithm returns to step 202. If yes, at 212, the remaining number of the time slots in the frame are pooled and allocated to the packet mode cards, although specific of the time slots are assigned as times for specific of the packet mode cards to raise a send request, as will be discussed below with reference to the packet mode contention algorithm. At 214, the actual slot assignment (i.e., distribution of "selects") is carried out, with the selects to the different cards or to packet mode availability being distributed in the two hundred fifty-six timeslot frame in accord with a desired framing algorithm such as disclosed in previously incorporated U.S. Pat. No. 4,888,770 to Bains, U.S. Pat. No. 4,885,745 to Gordon, and U.S. Pat. No. 4,727,536 to Reeves et al., or otherwise.

Figure 5:
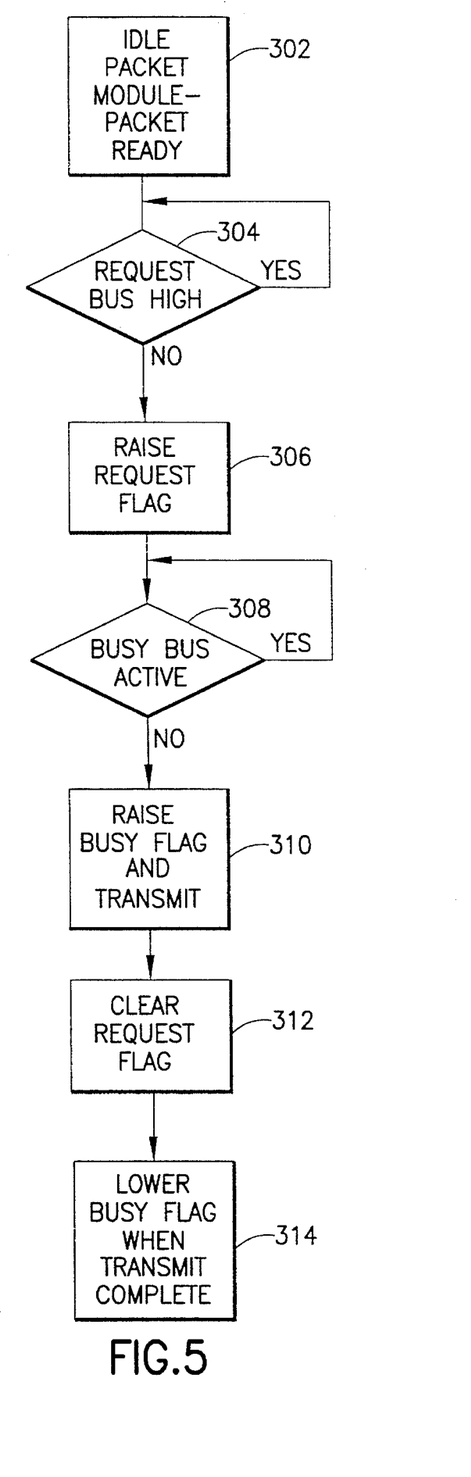
FIG. 5 is a flow chart of the bus arbitration scheme used for packet mode sources.

Functioning of the packet cards such as the TPP 30*d* is best understood with reference to FIGS. 5 and 6*a*–6*d*. FIG. 5 shows the bus arbitration scheme for any of the packet modules. At step 302 the packet module is seen to be in the idle state. When a packet is ready for transmission, the packet module checks at 304 to see whether the request bus (i.e., the request thread of the backplane) is already raised. If a request flag is raised, the packet module continues to check until the request flag is dropped. If the flag is not raised, or it has been dropped, the packet module having a packet ready for transmission may raise the request flag at 306 when a select for the packet pool has been generated, and (in order to avoid contention) the select corresponds to the request flag start time for that particular packet module. If the packet pool is selected, but the select corresponds to the request start time for another packet module, the particular packet module must wait to raise the request flag. After raising its request flag, the packet module must check at 308 to see whether the data packet "busy" thread of the data bus is active. If it is active, i.e., another packet mode module is continuing to send a packet, the packet module must wait. When the data packet "busy" thread is cleared, the packet module can start transmitting its packet at 310 whenever any of the packet timeslots are selected. Upon starting to transmit the packet, the packet module clears its own request flag at 312, and continues transmitting its data packet during all pool selects (i.e., selects of the packet pool timeslots) until the transmission is complete; at which time it lowers its signal on the "busy" thread at 314 in order to permit another packet module to send its packet. It should be appreciated that every packet mode card preferably includes a mechanism for monitoring and deactivating the busy thread in case a malfunction causes the busy bus to remain active longer than a predetermined maximum time.

It should be appreciated that the packet mode cards enable the transfer of a packet of data, also called a data unit, onto and off of the backplane bus. The data unit is not necessarily a contiguous packet, but typically includes smaller packets or information fields, including a header, data, and a trailer concatenated together. The data unit is detected on the backplane by all packet mode modules, checked for address (which is included in the header), and if destined for a particular packet mode module, accepted, buffered, and sent to the processor memory by the receiving packet mode module.

The packet mode module is preferably arranged to run in several modes of operation, including a normal mode, a disable or off-line mode, and a diagnostic mode, which are all controlled by the microprocessor of the module which is responsible for the configuration and control of the module. In the normal mode which is described in more detail below, the packet mode module may be in an idle state, or may receive data from or transmit data onto the backplane. In a disable or off-line mode, no data is transferred to or from memory, and all backplane drivers are disabled so that the packet mode module may be removed from the shelf without interrupting data flow among other modules on the shelf. In a self-diagnostic mode (which is accomplished under control of the microprocessor 124 of the packet mode module), the packet mode module tests its interfaces without interfering with other modules on the shelf. Thus, in the self-diagnostic mode, the backplane drivers and receivers are replaced with a test path, and the handshaking is handled by diagnostic hardware. In addition, ongoing diagnostic tests are preferably conducted by the microprocessors of the packet mode modules. An examples of such an ongoing diagnostic test is a checksum determination on the packet mode data.

The transfer of data utilizing the packet mode involves a preprocessing of a data unit by a packet mode sender, a transfer of the data unit onto the backplane, a receipt of the data unit by a packet mode receiver, and a transfer of the data unit to the processor of the packet mode receiver. In particular, and with reference to FIG. 2, the preprocessing is carried out by a processor 116 which builds a data unit having a header, real data, and a trailer. The first sixteen bits are typically the packet mode header which contains a destination address (bits 00–07) and a data unit number (bits 08–15) which permits the processor 116 to sequence the packets, with the destination address of 11111111 being used as a broadcast mode address. The real data is in the form of one or more of bytes (eight bits), shorts (sixteen bits), words (thirty-two bits), and quad-words (one hundred twenty-eight bits), but typically total an integer number of quadwords for efficiency of processor operation. The trailer typically includes a checksum for verification of the validity of the data unit.

The processor 116 passes the data unit, including the header, data, and trailer, to the backplane by utilizing the buffer 118 and the backplane interface 122. More particularly, all data processed by the processor 116 is split into sixteen bit words which are stored in the buffer 118. The backplane interface 122 of the packet mode card will raise the card's request flag on the backplane bus request thread when either the buffer 118 is partially filled to a predetermined amount (e.g., 512 bytes), or an end of data unit (EDU) flag is generated by the processor 116. After raising the request flag, the backplane interface 122 waits until the "busy" bus is no longer busy; i.e., the transmission of a previous packet has been completed. The backplane interface then raises the busy bus flag again, and starts placing the packet held in the buffer in sixteen bit words on the backplane bus during each packet pool select of the backplane frame. Once the backplane interface 122 drives the packet busy bus, thread, the backplane interface must present data on the backplane every pooled packet select. If the buffer 118 should become empty before an end of data unit flag is found by the backplane interface (i.e., before the trailer is available), a fill transfer is indicated, and the overhead bits on threads 18 and 19 are set accordingly. Upon completing the sending of the packet (i.e., after sending the trailer), the backplane interface drops the busy bus flag and sends an end-of-packet indicator in the overhead bits.

The backplane interfaces of all of the packet mode modules preferably continually monitor the state of the "busy" thread. In this manner, when the busy thread status changes from an inactive to an active status, upon the next pooled cycle when a data packet is placed on the backplane, the destination address for the packet will be received. Each backplane interface, upon receipt of the destination address, compares the address with its own address (typically provided to the backplane interface 122 by the module microprocessor 124) for acceptance. If the packet is addressed to its address or is indicative of a broadcast message, the data packet which is transferred over the backplane bus during the time slots for the packet pool is written by the backplane interface 122 into the buffer 118 for the packet mode module. The buffered data may then be processed by the data processor 116.

In operation, after the frame has been generated by the frame controller 40 with selects for the TDM cards, and selects for the packet card pool, the frame controller 40 selects a particular card or the packet pool to drive the backplane bus during each timeslot by sending out on the backplane bus select addresses, with each card coupled to the bus being assigned a unique select address. As described above, all TDM cards are assigned the backplane bandwidth that they require based on their respective rates and the mode in which they are operating. The remaining backplane bandwidth is assigned as a pool for the packet processing cards. Whenever a TDM card is selected, it sends a bit or byte (nibble) of data over the backplane bus depending upon whether it is working in bit or byte mode. Whenever the packet pool is selected, whichever packet mode module has control of the busy bus sends a word (sixteen bits) of the data packet over the backplane. In this manner, true multiplexing of bit, byte (nibble) and packet data is accomplished.

There has been described and illustrated herein a time division multiplexed backplane system which accommodates packet mode data. While a particular embodiment of the invention have been described, it is not intended that the invention be limited thereto, as it is intended that the invention be as broad in scope as the art will allow and that the specification be read likewise. Thus, while a general description of the modules coupled to the backplane bus has been provided, it will be appreciated that the modules could be arranged in different manners, and with different components. Also, while particular framing algorithms having been disclosed for use on the backplane, it will be appreciated that other framing algorithms can be utilized, provided that the TDM modules are provided with sufficient bandwidth to handle their data throughput, and provided that the substantially all of the remainder of the bandwidth is provided as a pool to the packet based modules for their data throughput. In addition, while a particular contention algorithm has been provided for determining which packet based module will have access to the backplane, it will be appreciated that other contention algorithms could be utilized. Indeed, instead of having the packet based modules arbitrate contention among themselves by setting which module can raise the request bus during specific packet pool selects, the arbitration could be conducted by the frame controller means if desired. It will therefore be appreciated by those skilled in the art that yet other modifications could be made to the provided invention without deviating from its spirit and scope as so claimed.

We claim:

1. A telecommunications backplane system, comprising:

a) a backplane bus having a plurality of threads;

b) a plurality of time division multiplexed (TDM) data modules coupled to said backplane bus;

c) a plurality of packet based data modules coupled to said backplane bus; and d) a frame controller means coupled to said backplane bus, said frame controller means for generating a frame having a first plurality of timeslots for and sufficient to handle all fixed rate time division multiplexed data traffic provided by said plurality of TDM data modules on said backplane bus, and a second plurality of timeslots for packet-based data traffic provided by said plurality of packet based data modules, said frame controller means for generating selects to said plurality of TDM data modules according to said frame, wherein each of said TDM data modules places at least one data bit and a plurality of address bits on said backplane bus when selected by said frame controller according to said frame, and each of said packet based data modules contends for access to said backplane bus and sends data packets including a header containing an address, packet data, and a trailer on said backplane bus as a series of words on said backplane bus during said second plurality of timeslots after having successfully contended for access to said backplane bus.

2. A telecommunications backplane system according to claim 1, wherein:

said frame controller means generates a frame by assigning said plurality of TDM data modules said first plurality of timeslots in said frame, and by assigning at least substantially the remainder of timeslots in said frame as a pool for said packet based data modules.

3. A telecommunications backplane system according to claim 1, wherein:

said plurality of threads comprises at least twenty threads, said plurality of address bits comprises at least twelve address bits, and said packet based data words include at least sixteen bits of data.

4. A telecommunications backplane system according to claim 1, wherein:

said series of words are sent in sequential of said plurality of second timeslots.

5. A telecommunications backplane system according to claim 1, wherein:

one of said plurality of threads is a packet mode request thread, and another of said plurality of threads is a packet mode busy thread, and each of said packet mode modules includes a contention means for controlling said request thread when said packet mode module is ready to send a data packet and said request thread is not controlled by another of said packet mode modules, wherein said contention means controls said busy thread while it sends a data packet.

6. A telecommunications backplane system according to claim 5, wherein:

said contention means releases control of said request thread upon obtaining control of said busy thread.

7. A telecommunications backplane system according to claim 6, wherein:

said contention means releases control of said busy thread upon completion of sending a data packet.

8. A telecommunications backplane system according to claim 5, wherein:

said frame controller means generates a frame by assigning said plurality of TDM data modules said first plurality of timeslots in said frame, and by assigning at least substantially the remainder of timeslots in said frame as a pool for said packet based data modules.

9. A telecommunications backplane system according to claim 8, wherein:

each said contention means for controlling said request thread for each of said plurality of packet based data modules is arranged such that said contention means can only raise said request thread at specific selects of said pool, the selects of said pool for raising said request thread being different for each of the contention means of the packet based data modules so that only one packet based data module can raises said request thread at a time.

10. A telecommunications backplane system according to claim 3, wherein:

said plurality of TDM data modules includes at least one bit mode module which provides one bit of data on said backplane data bus for each select of said bit mode module.

11. A telecommunications backplane system according to claim 10, wherein:

said plurality of TDM data modules includes at least one byte mode module which provides at least a nibble of four bits of data on said backplane data bus for each select of said byte mode module.

12. A telecommunications backplane system according to claim 11, wherein:

said bit mode module provides at least one bit of control information on said backplane data bus for each select of said bit mode module, and said byte mode module provides at least one bit of control information on said backplane data bus for each select of said byte mode module.

* * * * *